D. Hull.
Domestic Oven.
No 8116X Patented Mar. 28, 1834.
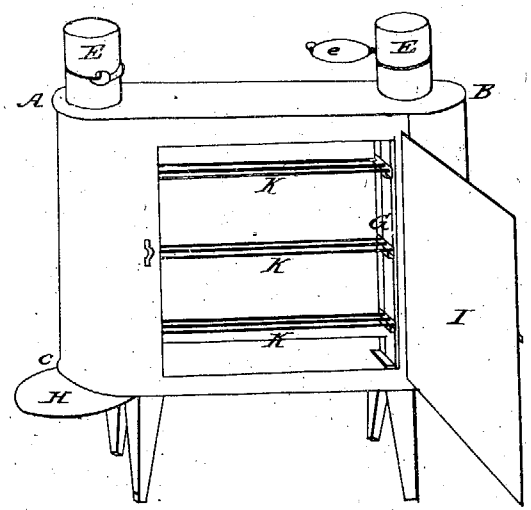
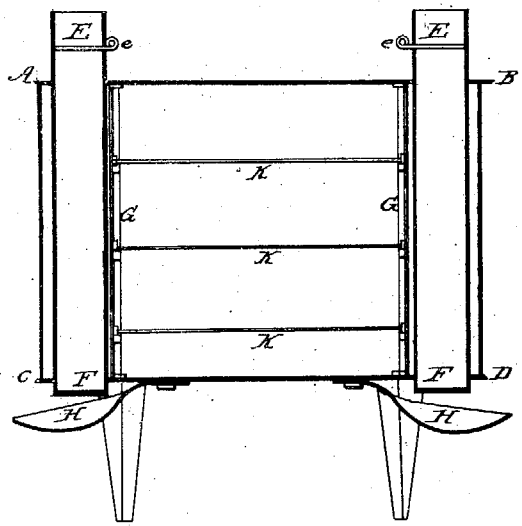
THE NORRIS PETERS CO., WASHINGTON, D. C.

David Hull of the City of Utica State of New York.

Letters Patent.

The schedule referred to in these Letters Patent and making a part of the same, containing a description in the words of the said David Hull himself of his improvement in the portable baking oven To all to whom these presents shall come Be it known that I David Hull of the City of Utica in the County of Oneida and State of New York, have invented a new and useful portable baking oven. and that the following is a full and exact description of the construction. and operation of the same as invented by me, The figure one represents a view of the portable oven The oven is to be made of sheet tin or any other metal or of wood lined with metal or brick or stone, the shape is usually to be an oval cylinder with plain top and bottom, but it may be made of any other form that is desired, In the figure A, B, C, D, is the cylinder which forms the exterior of the oven with a door I in the side Two heaters E.F. E.F. Fig 1. & figure 3 pass through the oven They are cylindrical pipes made of sheet or cast metal or fire brick open at the top E with a grate at the bottom F and a damper at or near the top c, — These heaters are to receive fuel at the top and the damper is intended to regulate the draught Beneath the heaters are fixed small dishes to catch the ashes as H. fig 1 and figure 3, The heaters are to be either made of stationary or to be moveable so as to be taken out at pleasure Two screens G, G, fig 1 & fig 3, made of slips of metal are placed in the oven immediately in front of the heater and are intended to equalize the heat and to serve for racks to secure

[illegible]

grates, upon which to place the articles to be cooked, The grate K, K, are ordinary wire grates, ~ The method of using the oven, is to place the articles to be cooked upon the grate and close the door. Fuel is then to be put in the heaters which can be kept at proper temperature by the use of their dampers, in regulating the draught The principle upon which the petitioners oven operates is the use of fuel in such a manner, that none of the heat to be created thereby shall be lost, or wasted.

Witness my hand this eighth day of March A.D. 1834

Witnesses

William Fray
John G. Hayes

David Hull

Exd. H.H.C.

[520 wds]